United States Patent [19]

Breen

[11] 4,341,944

[45] Jul. 27, 1982

[54] REDUCTION OF ARC BLOW IN MULTI-ELECTRODE WELDING

[75] Inventor: Nixon B. Breen, Kingston, Canada

[73] Assignee: Alcan Research and Development Limited, Montreal, Canada

[21] Appl. No.: 967,847

[22] Filed: Dec. 8, 1978

[30] Foreign Application Priority Data

Dec. 21, 1977 [CA] Canada ............................... 293606

[51] Int. Cl.³ .............................................. B23K 9/08
[52] U.S. Cl. .................................... 219/123; 219/74; 219/137 R
[58] Field of Search ................... 219/74, 75, 122, 123, 219/124.1, 137 R; 336/233

[56] References Cited

U.S. PATENT DOCUMENTS

| 2,299,679 | 10/1942 | Casner | 219/123 |
| 2,491,347 | 12/1949 | White | 336/233 X |
| 3,242,309 | 3/1966 | Anderson et al. | 219/124.1 |
| 3,641,309 | 2/1972 | Klebel | 219/123 |
| 3,673,374 | 6/1972 | Hauck | 219/123 X |
| 4,119,828 | 10/1978 | Bykhovsky et al. | 219/123 X |

OTHER PUBLICATIONS

*The Welding Journal;* Oct. 1941, p. 427-S-436-S; "Magnetic Arc Blow", by Jennings et al.

*Primary Examiner*—J. V. Truhe
*Assistant Examiner*—Keith E. George
*Attorney, Agent, or Firm*—Cooper, Dunham, Clark, Griffin & Moran

[57] ABSTRACT

A method and apparatus for reducing "arc blow" in multi-electrode welding of a metallic workpiece. Arc blow is produced by interaction between the magnetic fields produced by the closely spaced arcs and electrodes, and takes the form of the end arcs being attracted inwardly towards the others. This reduces the welding efficiency and the maximum welding speed. The invention reduces or eliminates the arc blow by providing shunts made of magnetically permeable material close to the arc-producing ends of the electrodes at the two ends of the row of electrodes. This reduces the concentration of magnetic flux in these regions and reduces the deviation of the end arcs. The invention can be applied wherever multi-electrode welding is used, but is especially useful when the workpiece is made of aluminum as arc blow is a particular problem with this metal.

17 Claims, 9 Drawing Figures

REDUCTION OF ARC BLOW IN MULTI-ELECTRODE WELDING

BACKGROUND OF THE INVENTION

This invention relates to multi-electrode welding of metallic workpieces, especially those made of aluminum, and, in particular, the invention relates to the reduction of so-called "arc blow" obtained when a workpiece is welded with a multi-electrode welding gun.

It is already known that welding speeds for arc welding seams and the like can be increased by increasing the heat transfer rate to the weld plate. One method of accomplishing this is to increase the arc current, but it has been found that when the current reaches about 200 to 300 amperes in normal operation, the welding speed cannot be further increased significantly by producing further increases in the arc current. The reason for this is believed to be that, instead of the heat being concentrated around the arc axis, it is instead distributed over a wider area. Furthermore, detrimental effects may also be produced by arc "pumping" at high currents, thus leading to undercut and weakened welds.

It is also known that, instead of increasing the arc current, the welding speeds can be increased by providing several welding electrodes arranged in a row in substantially equally spaced parallel relation to one another with the arc-producing ends of the electrodes being approximately equally spaced from the weld plate and aligned with the seam to be welded. Each of the electrodes provides a separate arc and the electrodes are all moved as a unit in a direction parallel to the seam to be welded. The heat from each of the electrodes adds together without substantial dissipation, so that the maximum welding speed is found to be much greater than the maximum obtained by the use of a single electrode, without any undesirable effects, such as undercutting. It is not usually necessary to provide more than four electrodes, although more than four may be used, and in some cases, only two or three may be required.

Canadian Pat. No. 749,527, issued on Dec. 27, 1966, to Union Carbide Corporation (corresponding to U.S. Pat. No. 3,242,309 issued Mar. 22, 1966), describes a system in which a welding gun is provided with a plurality of electrodes for providing relatively short welding arcs between the ends of the electrodes and the workpiece. During use, the arcs are shielded from the atmosphere by a protective inert gas and the electrodes are all moved as a unit in a direction parallel to the seam to be welded. The maximum value of the welding speed is disclosed as being equal to the number of electrodes multiplied by the normal welding speed of one such electrode.

It is well known, however, that a problem, known as "arc blow," is encountered when two or more electrodes are located close together in order to produce a plurality of arcs. Arc blow is produced by magnetic interaction between the arcs and is the tendency of the arcs to be attracted towards each other. When two arcs are used, the arcs are attracted to each other and thus deviate inwardly from the desired parallel paths. When more than two arcs are used, the leading arc tends to bend rearwardly and the trailing arc tends to bend forwardly, but the other arcs remain substantially unaffected. Arc blow reduces the effectiveness of the welding gun and thus reduces the maximum welding speed. In the past, a compromise situation has had to be found because, in order to minimize the dissipation of heat during welding and thus to maximize the welding speeds, the electrodes should preferably be located as close together as possible. However, as the electrode spacing is reduced, the arc blow effect increases.

The relationship between the spacing of the various electrodes is discussed in Canadian Pat. No. 749,527, and it is disclosed that the magnetic interaction between the arcs depends upon the number of arcs, the arc current, the arc length and the electrode spacing. It is suggested in the patent that the effect of arc blow can be minimized in the case of three or more electrodes each carrying 100 amperes or more if the spacing is $\frac{1}{4}$ inch or more for short arc lengths of 1/32 to 1/16 of an inch, and half an inch or more for an arc length of $\frac{1}{8}$ inch. For current levels of from 10 to 100 amperes/electrode an arc length below 1/32 of an inch, the patent discloses that the spacing between the arcs should be between $\frac{1}{8}$ to $\frac{3}{8}$ of an inch. Thus, in general, the arc length should be less than $\frac{1}{8}$ inch and the electrode spacing should be no greater than one inch, center to center.

Although the above Canadian patent has suggested a set of conditions for minimizing the disadvantageous effects of arc blow, it would be better to provide alternative means for minimizing or eliminating the magnetic interaction between the electrodes in order to remove the above-mentioned constraints upon the electrode spacing and the arc length, etc., thus producing greater flexibility.

Furthermore, it has been found that the conditions for minimizing arc blow suggested in the above Canadian patent are not effective when the workpiece to be welded is aluminum or an aluminum alloy. Until now, essentially all of the commercial use of multi-electrode welding has been with stainless steel and therefore the problems encountered with the welding of aluminum products have not been fully appreciated. The reason why aluminum products should react differently from stainless steel is not absolutely clear, but it is thought that effective arc lengths may be greater than anticipated when aluminum products are welded, for the following reasons.

The arc lengths used when welding ferrous metals, and particularly stainless steel, are extremely short and the true arc length (measured from the arc-producing end of the electrode to the surface of the weld pool) does not differ greatly from the electrode-to-work distance (measured from the arc-producing end of the electrode to the surface of the work in the absence of an arc). Aluminum, however, is believed to behave very differently as the weld pool can be well below the surface of the parent metal. Thus the true arc length can be much greater than the electrode-to-work distance and this longer arc is more susceptible to arc blow.

An alternative method of controlling arc blow is thus required. One known method of controlling an arc is employed by Cyclomatic Industries Inc. of San Diego, Calif., U.S.A., in its electromagnetic probe system. In this system, a magnetic field is generated by an external power source in the region of an arc produced by a single-electrode welding gun. The magnetic field can be oscillated so that motion of the arc can be produced either parallel to or perpendicularly to the direction of movement of the welding gun. Alternatively, "wandering" of the arc can be eliminated by providing a strong stable magnetic field. However, the use of electromagnetic probes is not suitable to control arc blow in multi-electrode guns because of the complexity and high cost and because the electromagnetic fields used to correct the arc blow of the outermost arcs of a multi-electrode gun would interfere with the closely adjacent intermediate arcs. The electromagnetic probe system is thus only economical and effective when used with single electrode welding guns.

SUMMARY OF THE INVENTION

It is an object of the present invention to provide an effective system for the reduction of the magnetic interaction between the various arcs produced by a multi-electrode welding gun.

To this and other ends, the present invention broadly contemplates the provision of a multi-electrode welding gun for arc-welding a metallic workpiece, comprising a plurality of spaced welding electrodes arranged in a row with a first one of said electrodes at one end of the row and a second one of the electrodes at the other end of the row, housing means for holding the row of electrodes and a pair of magnetically permeable shunts respectively disposed adjacent the first and second electrodes for reducing arc blow at the ends of the row.

Thus, more specifically, according to one aspect of the invention, there is provided a multi-electrode welding gun for arc welding a metallic workpiece, comprising a plurality of welding electrodes, a housing for holding the electrodes in generally parallel, closely spaced, side-by-side relation to form a row with the arc-producing ends of the electrodes extending outwardly from the housing; conduit means for conveying a shielding gas to the arc-producing ends of the electrodes; and a pair of shunts made of magnetically permeable material, one being located adjacent the arc-producing end of the electrode at one end of the row, and the other being located adjacent the arc-producing end of the electrode at the other end of the row, the shunts being positioned with respect to the end electrodes to reduce arc blow of the respective arcs.

According to another aspect of the invention, there is provided a method of reducing arc blow in the multi-electrode welding of a metallic workpiece, in which a plurality of welding arcs are produced by a welding gun having a plurality of closely spaced electrodes arranged in a row with their longitudinal axes generally parallel, which method comprises locating a shunt made of magnetically permeable material adjacent the arc-producing tip of the electrode at each end of the row in such a position that magnetic attraction between the arcs is reduced or eliminated.

It is believed that the shunts provided adjacent the end electrodes reduce the magnetic flux concentration at the ends of the electrode row and thus reduce the magnetic interaction between the arcs. In this way, arc blow can be minimized or eliminated without the need for complex or cumbersome apparatus.

Multi-electrode welding guns usually have two to four electrodes. It should be noted, however, that the invention is not necessarily limited to this number of electrodes and any suitable number can be employed.

The shunts are preferably made of any ferromagnetic material of reasonably high magnetic permeability with low hysteresis, such as mild steel and those materials commonly referred to as "magnetically soft" materials, e.g. silicon steels, iron-nickel and iron-cobalt alloys.

Further features and advantages of the invention will be apparent from the detailed description hereinbelow set forth, together with the accompanying drawings.

DETAILED DESCRIPTION

Figure 1A:
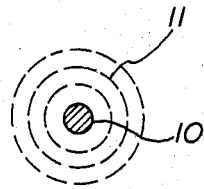
FIG. 1(a) represents a cross section through a single electrode showing the magnetic field therearound when an arc is produced by the electrode.
Figure 1B:
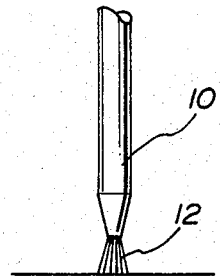
FIG. 1(b) is a side elevation of the electrode of FIG. 1(a) showing an electric arc extending therefrom.

FIG. 1(a) shows the magnetic flux 11 surrounding a single arc-producing electrode 10 shown in side elevation in FIG. 1(b). The direction of the magnetic flux depends upon the direction in which the current is flowing through the electrode, but is uniformly distributed around the arc 12 and does not affect the arc, i.e. it does not cause deflection of the arc or "arc blow."

Figure 2A:
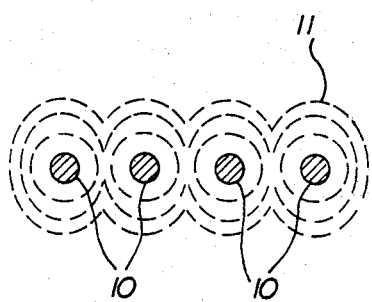
FIG. 2(a) is a cross section through four closely spaced electrodes showing the magnetic field therearound when arcs are produced by each of the electrodes.
Figure 2B:
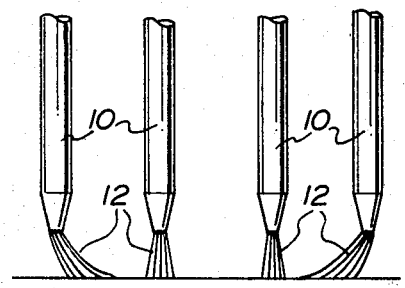
FIG. 2(b) is a side elevation of the four electrodes of FIG. 2(a) and the arcs extending therefrom.

In FIG. 2(a), the magnetic flux 11 associated with a four-electrode welding gun is shown. The outer lines of magnetic flux 11 around each electrode 10 and arc 12 tend to cancel each other out where they meet between the electrodes and arcs, but they add (i.e. concentrate) at the two extreme ends of the row of electrodes, as shown. This is believed to produce an unequal force acting on the end arcs causing them to deflect inwardly as shown in FIG. 2(b). This deflection or arc blow can become so severe that the arcs interfere with each other to the extent that the welding speed must be reduced or that welding becomes totally impossible.

Figure 3A:
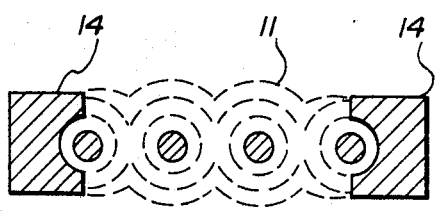
FIG. 3(a) is a cross section similar to FIG. 2(a) but showing the location of magnetic shunts according to one embodiment of the present invention.
Figure 3B:
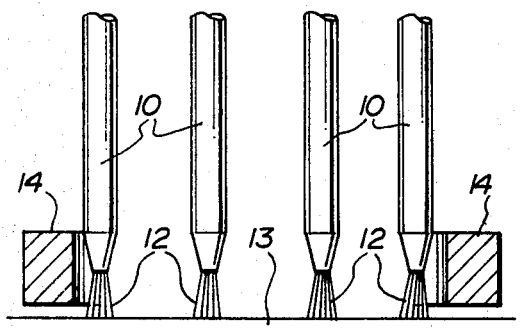
FIG. 3(b) is a side elevation of the electrodes of FIG. 3(a) and the arcs produced thereby, the shunts being shown in cross section.

FIGS. 3(a) and 3(b) show an embodiment of the present invention in which magnetically permeable shunts 14 are provided at the two ends of the row of electrodes. The magnetic flux 11 associated with this arrangement is shown in FIG. 3(a) and it can be seen that the effect of the concentration of magnetic flux at the ends of the multi-electrode gun are nullified by the presence of the magnetically permeable shunts 14 at each end, as shown. The shunts are made from a magnetically permeable material, preferably a ferromagnetic material as referred to above such as permeable mild steel, and their location relative to the arc and workpiece is preferably adjustable. The shunts are more permeable than air and thus the magnetic flux will tend to flow in them rather than in the air. Thus, by proper location of the shunts, the imbalance of magnetic forces on the end arcs can be cancelled and arc blow can be prevented as shown in FIG. 3(b).

The optimum positions of the shunts can easily be found by simple trial. The positions of the shunts can be adjusted vertically and horizontally until the magnetic interaction of the arcs is eliminated. One such position is shown in FIG. 3(b) in which the shunts extend beyond the ends of the electrodes and terminate close to the workpiece 13.

Figure 4:
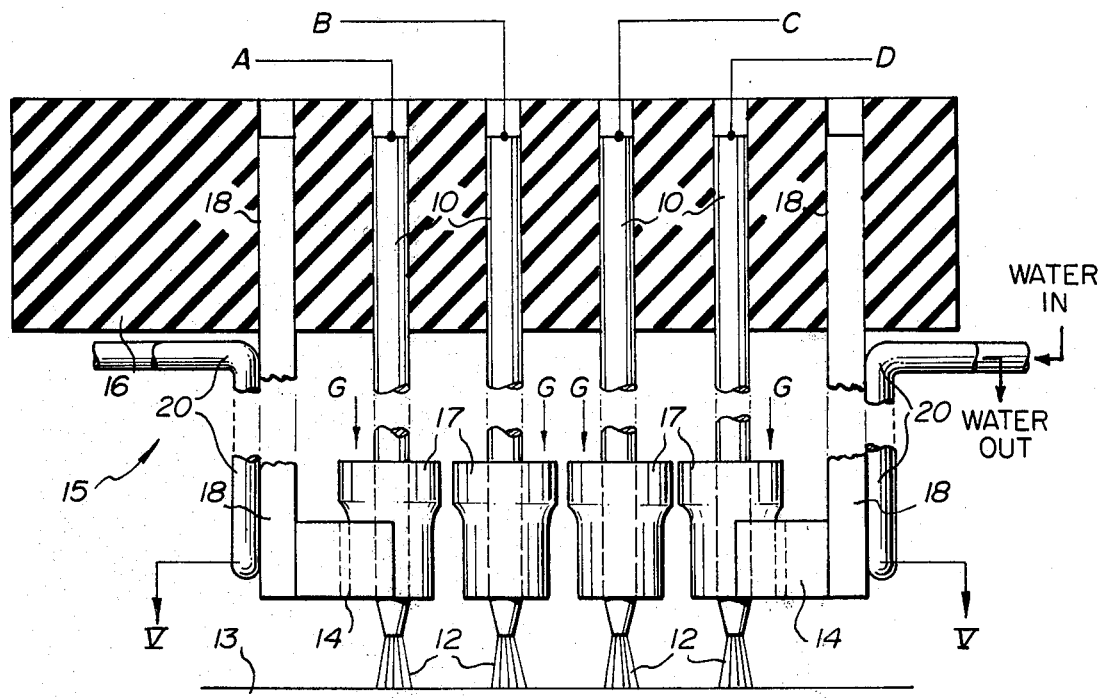
FIG. 4 is an exploded side view, partly in cross section, of a multi-electrode welding gun according to one embodiment of the present invention.

A suitable welding gun 15 illustrating the present invention is shown in a very simplified manner in FIG. 4. This shows a group of four electrodes 10 supported in an insulating block or housing 16. The upper ends of the electrodes are connected to separate power sources A, B, C and D, and the lower ends (arc-producing ends) of the electrodes project through tubular gas sleeves 17, known as cups, which surround and are coaxial with the electrodes, except that the arc-producing ends project by a short distance from the gas cups. The electrodes are preferably made of tungsten, but any suitable electrode material can be used. The gas cups may be ceramic although they are preferably of non-ferrous material such as copper.

Apart from the shunts 14 and their supporting arms 18, the four electrode welding gun 15 may be entirely conventional. Although not shown in the drawings, the gun is preferably water-cooled and the four electrodes are preferably individually height-adjustable so that they can be properly aligned with the workpiece. The gun is advantageously adjustably mounted on a support to allow vertical, transverse and longitudinal adjustment.

As noted above, each of the electrodes 10 is insulated from the others and provided with a separate power source so that the welding current can be different in each electrode. An alternative to this would be to provide a single power source with control means (variable resistors) to distribute the welding current in the desired manner between the electrodes.

The power sources A, B, C and D are coupled with striking units (not shown) for the simultaneous striking of the arcs from each of the electrodes.

The welding current to be employed, the electrode-to-work distance and other operating conditions can be left to the discretion of the operator from the various parameters known in this technology.

A shielding gas is passed through the gas cups 17 in the direction of the arrows G around the electrodes to isolate the arc and the welding pool (not shown) from the atmosphere. The gas may be any conventional shielding gas such as argon, helium, or an argon and helium mixture. The gas may be supplied from a suitable compressed gas bottle (not shown).

A pair of shunts 14 is provided at the ends of the row of electrodes. Support arms 18 made of any suitable material (although preferably made of a nonferrous metal such as copper) support the shunts 14, which are in the form of steel blocks having semicylindrical indentations in the surfaces facing the electrodes. These indentations are shaped to surround 50% of the opposed surfaces of the end gas cups in order to nullify the concentration of magnetic flux in these regions and thus to minimize arc blow.

Figure 5:
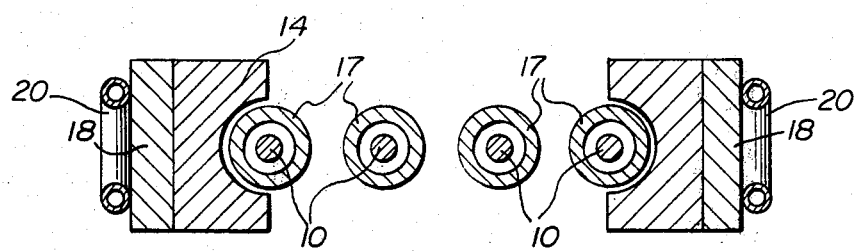
FIG. 5 is a cross section taken along the lines V—V of FIG. 4.

In the case of a four-electrode welding gun, as shown, the shunts are preferably approximately half an inch thick and one inch wide. They should preferably fit as closely to the respective gas cups as possible. The support arms 18 are preferably vertically adjustable and water-cooled as indicated schematically at 20 in FIGS. 4 and 5. The vertical location of the shunts 14 controls the degree of influence that the shunts have on the amount of arc blow. The bottom surface of the shunts are preferably parallel to the surface of the workpiece 13.

Figure 6:
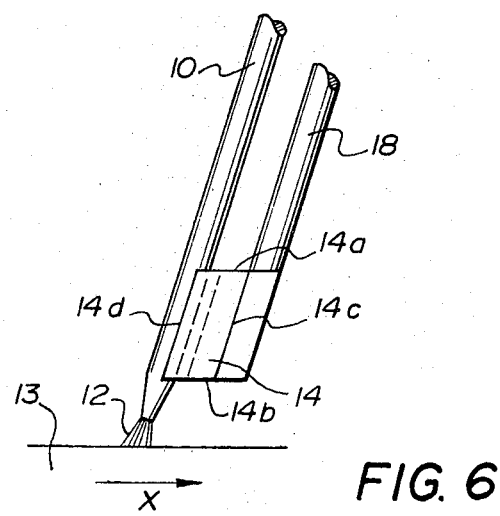
FIG. 6 is a side elevational view of a trailing electrode of a multi-electrode welding gun and the associated shunt, the electrode being at an angle to the vertical.

Although the drawings show a vertical orientation of the electrodes, the group of electrodes may be oriented at an angle, preferably of about 10°, from the vertical usually in the leading direction of the gun (this is sometimes known as the "torch angle"). In such an operation, the upwardly oriented side edges of the shunts are preferably sloped to a corresponding angle but the top and bottom are preferably made parallel to the workpiece 13. Thus, a different set of shunts is preferably required for each torch (i.e. welding gun) angle used. An example is shown in FIG. 6 in which only the trailing electrode 10 is shown for simplicity, and the direction of movement of the workpiece 13 is shown by the arrow X. As can be seen from the drawing, the upper and lower surfaces, 14a and 14b respectively, of the shunt 14 are parallel to the surface of the workpiece 13, whereas the trailing and leading surfaces, 14c and 14d respectively, are at the same angle to the vertical as the electrode 10.

Although the invention has been described in connection with FIG. 4 as relating to TIG welding, the process is equally applicable to MIG welding. Furthermore, either AC or DC power supplies may be employed and the invention is equally applicable to both.

The following is an example of a welding procedure carried out employing the present invention. However, the scope of the invention is not intended to be limited to this example.

EXAMPLE

A welding gun similar to that shown in FIG. 4 of the drawings was used to seam-weld a three-inch aluminum pipe (Alloy AA3004-H022) with a wall thickness of 0.085 inch.

The electrodes were 3/16 of an inch in diameter and were made of zirconiated tungsten. The electrodes projected out of their gas cups by a distance of 3/16 of an inch. the gas cups were ⅜ of an inch in internal diameter.

The arc and welding pool was protected by argon gas passing through the gas cups at a total flow rate of 70 cu.ft./hr.

The electrode-to-work distance was less than 1/16 of an inch and the torch angle was 10° (leading).

The currents at the respective electrodes were as follows, the numbering commencing with the leading electrode:

No. 1 electrode—250 amps AC,
No. 2 electrode—240 amps AC,
No. 3 electrode—230 amps AC, and
No. 4 electrode—200 amps AC.

The shunts were made of mild steel and were approximately half an inch thick and one inch wide. They were designed to cover 50% of the circumference of the respective gas cups and were fitted closely thereto. The shunts were mounted on water-cooled nonmagnetic support arms (made of copper) which were vertically adjustable. The vertical position of the shunts was adjusted so that the bottom surfaces of the shunts were level with the lowest parts of the gas cups.

With this arrangement, it was possible to seam-weld the aluminum pipe at 210 in./min. (17.5 ft./min.) and to produce a weld of high quality. This speed is considerably greater than previous welding speeds obtainable with a four-electrode welding gun and an aluminum substrate. More specifically, the welding speed was more than double the maximum welding speed obtainable in the absence of the shunts.

It is to be understood that the invention is not limited to the features and embodiments hereinabove specifically, set forth, but may be carried out in other ways without departure from its spirit.

I claim:

1. A multi-electrode welding gun for arc welding a metallic workpiece comprising
   (a) a plurality of spaced welding electrodes, each producing an independent arc and having an arc-producing end, arranged in a row with a first one of said electrodes at one end of the row and a second one of said electrodes at the other end of the row;
   (b) housing means for holding said row of electrodes; and
   (c) a pair of magnetically permeable shunts respectively disposed adjacent the arc-producing ends of said first and second electrodes for reducing inward deviation of the arcs at the ends of said row.

2. A welding gun according to claim 1, wherein the shunts are made of a ferromagnetic material of high magnetic permeability and low hysteresis.

3. A welding gun according to claim 1, wherein the shunts are made of a material selected from the group consisting of mild steel, silicon steel, iron-nickel alloy, and iron-cobalt alloy.

4. A welding gun according to claim 1, claim 2 or claim 3, wherein each of the shunts includes a concave surface partially surrounding, but spaced from, the electrode adjacent the shunt.

5. A welding gun according to claim 1, wherein each of the shunts includes a concave surface partially surrounding, but spaced from, the electrode adjacent the shunt, and said concave surface is semicylindrical.

6. A welding gun according to claim 1, claim 2 or claim 3, wherein said electrodes extend from said housing means in generally parallel, closely spaced side-by-side relation to each other at an acute angle to the workpiece surface and wherein each of the shunts is correspondingly shaped so that a surface thereof facing the electrode adjacent the shunt is generally parallel to the longitudinal axes of the electrodes, and a surface of the shunt facing the workpiece is generally parallel to the surface of the workpiece.

7. A welding gun according to claim 1, claim 2 or claim 3, further including conduit means for conveying a gas to the arc-producing ends of the electrodes, said conduit means including a plurality of tubular sleeves, each extending along a respective electrode for a part of its length and terminating near said arc-producing end, and wherein the shunts are respectively located closely adjacent the tubular sleeves associated with the end electrodes.

8. A welding gun according to claim 7, wherein each shunt includes a semicylindrical concave surface surrounding approximately 50% of the surface of the respective adjacent tubular sleeve.

9. A welding gun according to claim 7, wherein the tubular sleeves are made of a nonferrous metal.

10. A welding gun according to claim 9, wherein the tubular sleeves are made of copper.

11. A welding gun according to claim 10, wherein the shunts are connected to said housing means by support arms.

12. A welding gun according to claim 11, wherein the support arms are movably mounted to said housing means so that the positions of said shunts relative to said arc-producing ends of the end electrodes can be adjusted.

13. A welding gun according to claim 11, wherein the support arms are made of a nonferrous material.

14. A welding gun according to claim 13, wherein the material is copper.

15. A welding gun according to claim 11, wherein the support arms are water-cooled.

16. A method of reducing arc blow in the multi-electrode welding of a metallic workpiece, in which a plurality of welding arcs are produced by a welding gun having a plurality of closely spaced electrodes arranged in a row with their longitudinal axes generally parallel, which method comprises locating a shunt made of magnetically permeable material adjacent the arc-producing tip of the electrode at each end of the row in such a position that inward deviation of the arcs at each end of the row caused by magnetic attraction between the arcs is reduced or eliminated.

17. A method of welding a metallic workpiece, which comprises
   (a) forming arcs between a workpiece and a plurality of closely spaced welding electrodes arranged in a row,
   (b) isolating the arcs and adjacent areas from the atmosphere by surrounding the arcs with an inert gas,
   (c) moving the electrodes relative to the workpiece, and
   (d) reducing the magnetic flux concentration at the end regions of the electrode row in order to reduce the inward deviation only of the end arcs produced by magnetic interaction between the arcs, the magnetic flux concentration being reduced by locating shunts made of magnetically permeable material adjacent the end arcs.

* * * * *